United States Patent [19]
Brown et al.

[11] Patent Number: 5,190,307
[45] Date of Patent: Mar. 2, 1993

[54] SMOKELESS AUTOMOBILE

[76] Inventors: Randy M. Brown, 4262 Doublegate Dr., Douglasville, Ga. 30135; Robert E. Rivers, Valley Run Rd., Bremen, Ga. 30110

[21] Appl. No.: 747,517

[22] Filed: Aug. 20, 1991

[51] Int. Cl.$^5$ .............................................. B60D 1/28
[52] U.S. Cl. .................................... 280/271; 280/272; 340/576
[58] Field of Search ....................... 180/271, 272, 287; 340/573, 576

[56] References Cited

U.S. PATENT DOCUMENTS

| | | | |
|---|---|---|---|
| 3,773,145 | 11/1973 | Drexler | 187/105 |
| 3,947,812 | 3/1976 | Lee et al. | 340/457 |
| 4,223,692 | 9/1980 | Perry | 137/78.4 |
| 4,275,274 | 6/1981 | English | 369/22 |
| 4,359,725 | 11/1982 | Balogh et al. | 180/272 |
| 4,649,282 | 3/1987 | Ota et al. | 250/574 |
| 4,881,554 | 11/1989 | Obasogie | 137/270 |
| 5,012,226 | 4/1991 | Love | 180/272 |

Primary Examiner—Kenneth R. Rice
Attorney, Agent, or Firm—Louis T. Isaf

[57] ABSTRACT

An automotive anti-smoking apparatus which includes at least one smoke sensor for detecting the presence of smoke located within a passenger compartment of an automobile, a beeper for emitting a beeping sound within the passenger compartment when smoke is detected, an illuminated "No Smoking" sign located on the dashboard of the automobile for flashing on and off when smoke is detected within the passenger compartment, an audio message playback device for broadcasting an anti-smoking message within the passenger compartment when smoke is detected, an adjustable engine governor for controlling the speed of the automobile when smoke is detected within the passenger compartment, an ignition control mechanism for preventing an operator from turning on the automobile while smoke is detected within the automobile, and a control circuit through which other elements of the present invention receive power and are controlled. If smoke is detected by the sensor while the automobile is in motion, the control circuit instructs: the beeper to emit a beeping sound, the dashboard sign to flash on and off, the audio message playback device to broadcast an anti-smoking message, the engine governor to, after a short delay, slow the speed of the automobile, and the ignition control mechanism not to allow the car, after it has been turned off, to be turned on again until the smoke has been cleared from the passenger compartment.

13 Claims, 1 Drawing Sheet

000000000000000
SMOKELESS AUTOMOBILE

BACKGROUND OF THE INVENTION

The present invention relates generally to field of smoke detectors, and more specifically to the field of automotive anti-smoking apparatuses.

The harmful health risks associated with smoking, both for the smoker and for those exposed to second-hand smoke, have been known for a long time. Those who smoke in automobiles, given the enclosed passenger compartment, understandibly create greater risks for themselves, as well as the other passengers. Many people spend large parts of their days inside automobiles, thus exacerbating the problem. Furthermore, the smell of smoke can undesirably leach into the fabric of the automobile interior, and burning cigarettes can also easily leave burn marks throughout the interior, thus potentially reducing the perceived value of the automobile.

Various methods for breaking the smoking habit have been developed in the past and include psychological counseling, hypnosis, medication, and various smoking substitutes. While each of these methods have experienced some degree of success, they are voluntary and depend on at least a modicum of will power by the smoker.

U.S. Pat. No. 4,649,282, issued to Ota et al., discloses a smoke sensing apparatus for use in an automobile to automatically start operation of the air conditioner. Rather than deter a smoker from smoking within the automobile, that device accomodates the smoker, thus encouraging the smoking habit. U.S. Pat. No. 4,881,554, issued to Obasogie, discloses a habit-breaking ashtray which includes an internal smoke detector and anti-smoking message playback device. That patent makes no reference or implication regarding use in automobiles.

There is a need, therefore, for an automotive anti-smoking apparatus which effectively deters passengers from smoking within an automobile, thus solving these and other related, and unrelated, problems.

SUMMARY OF THE INVENTION

Briefly described, the present invention, in its most preferred embodiment, includes an automotive anti-smoking apparatus which includes at least one smoke sensor for detecting the presence of smoke located within a passenger compartment of an automobile, a beeper for emitting a beeping sound within the passenger compartment when smoke is detected, an illuminated "No Smoking" sign located on the dashboard of the automobile for flashing on and off when smoke is detected within the passenger compartment, an audio message playback device for broadcasting an anti-smoking message within the passenger compartment when smoke is detected, an adjustable engine governor for controlling the speed of the automobile when smoke is detected within the passenger compartment, an ignition control mechanism for preventing an operator from turning on the automobile while smoke is detected within the automobile, and a control circuit through which other elements of the present invention receive power and are controlled.

If smoke is detected by the sensor while the automobile is in motion, the control circuit instructs: the beeper to emit a beeping sound, the dashboard sign to flash on and off, the audio message playback device to broadcast an anti-smoking message, the engine governor to, after a short delay, slow the speed of the automobile, and the ignition control mechanism not to allow the car, after it has been turned off, to be turned on again until the smoke has been cleared from the passenger compartment.

It is therefore an object of the present invention to provide an automotive anti-smoking apparatus which deters passengers from smoking inside the passenger compartment.

Another object of the present invention is to provide an automotive anti-smoking apparatus which, upon detection of smoke within the passenger compartment of an automobile, produces one or more nuisances which encourage the smoker to stop smoking.

Still another object of the present invention is to provide an automotive anti-smoking apparatus which, upon detection of smoke within the passenger compartment of an automobile, produces a variety of nuisances including, at least, a flashing "No Smoking" dashboard sign, an anti-smoking audio message, and an annoying beeping sound.

Still another object of the present invention is to provide an automotive anti-smoking apparatus which controls various operational functions of the automobile.

Still another object of the present invention is to provide an automotive anti-smoking apparatus which includes an engine governor which gradually decreases the speed of the automobile when smoke is detected within the passenger compartment.

Still another object of the present invention is to provide an automotive anti-smoking apparatus which includes an ignition control mechanism which prevents an operator from turning on the automobile until smoke has been removed from the passenger compartment.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
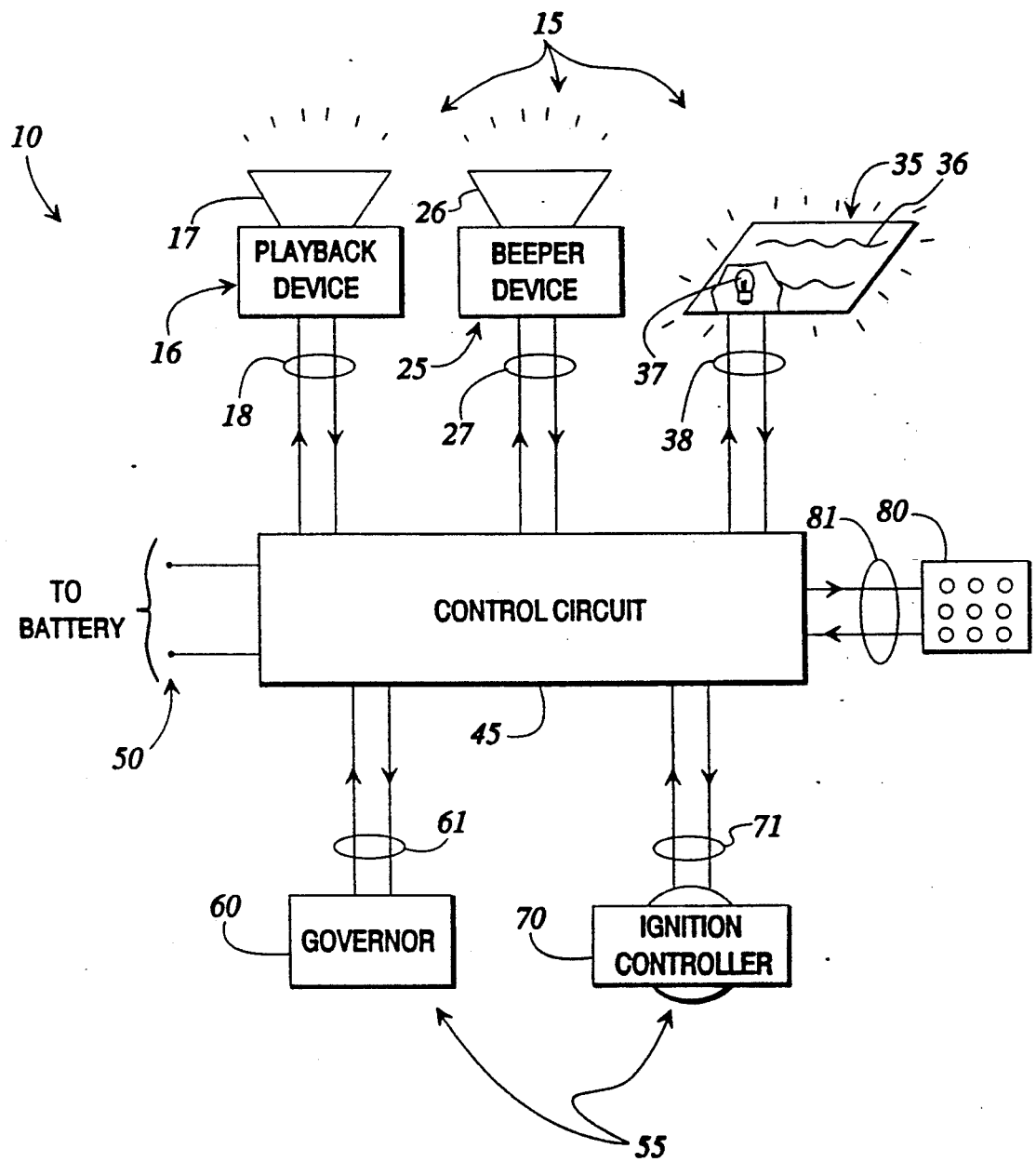
FIG. 1 is a block diagram of an anti-smoking apparatus in accordance the preferred embodiment of the present invention for use in a Smokeless Automobile.

Referring now in greater detail to FIG. 1, the preferred embodiment of the anti-smoking apparatus 10 includes three audio/visual devices 15 indicated as an audio message playback device 16, a beeper device 25, and a dashboard sign 35. The audio message playback device 16 includes a message speaker 17 to be located within a passenger compartment of an automobile (not shown), and message connectors 18 connect the audio message playback device 16 to a control circuit 45. In the preferred embodiment, one example of an acceptable audio message playback device 16 is one of the common digital message playback devices with digital storage capabilities currently used in automobiles. In other embodiments, an analog tape device, similar to those used with common answering machines, is used.

The beeper device 25 includes a beeper speaker 26 to be located within the passenger compartment, and beeper connectors 27 connect the beeper device 25 to the control circuit 45. The dashboard sign 35 is designed to be located on a dashboard of an automobile so that a sign message 36 is viewable by passengers inside the passenger compartment. The dashboard sign 35 includes an illumination element 37 located inside the dashboard sign 35, and sign connectors 38 connect the dashboard sign 35 to the control circuit 45.

The preferred embodiment of the anti-smoking apparatus 10 also includes a smoke sensor 80 located within the passenger compartment. Smoking connectors 81 connect the smoke sensor 80 to the control circuit 45. In other alternate embodiments of the present invention, multiple smoking sensors 80 are placed throughout the passenger compartment.

Also included in the preferred embodiment of the present invention are two operational control devices 55 represented as governor 60 and ignition controller 70. The governor 60 is designed to be connected to the automobile's engine (not shown) in a manner which allows the governor 60 to decrease and limit the speed of the engine. Goverrner connectors 61 connect the governor 60 to the control circuit 45. The ignition controller 70 is designed to be connected to the automobiles ignition circuitry (not shown) in a manner which allows the ignition controller 70 to prevent the automobile from being started. Ignition connectors 71 connect the ignition controller 70 to the control circuit 45.

Power for the anti-smoking apparatus 10 is supplied from the automobile's battery (not shown) through battery leads 50. The control circuit 45 of the present invention controls the operation of the audio/visual devices 15 and the operational control devices 55 in response to detection of smoke by the smoke sensor 80. In one embodiment of the present invention, the control circuit 45 includes common switches, delay mechanisms, and oscillators necessary to control the devices 15, 55, in performing their functions as described in the operation section below. In an alternate embodiment, these circuital elements are included as parts of the devices 15, 55, and the control circuit 45 simply joins the connectors 18, 27, 38, 81, 71, 61 series circuital relationships. In this alternate embodiment, the smoke sensor 80 includes a normally open switch which closes to complete the entire circuit when smoke is detected.

In operation in an automobile, the preferred embodiment of the present invention continually monitors the air inside the automobile passenger compartment for smoke generated by any of a variety of common sources, including, but not limited to, cigarettes, cigars, and pipes. When smoke is detected, the smoke sensor 80 generates a signal which is sent over the sensor connectors 81 to the control circuit 45. While the smoke is being detected by the smoke sensor 80, the control circuit 45 sends signals to the audio message playback device 16 over the message connectors 18 so that an audio message is broadcast over the message speaker 17 into the passenger compartment. In the preferred embodiment, the message is "This is a no smoking car. Please read the information located on the back of the driver's sunvisor that describes the special operating features of this car". It should be understood that other messages, such as "Smoking causes cancer," or "Cancer cures smoking", are also considered to be within the scope of the present invention.

When the smoke is being detected by the smoke sensor 80, the control circuit 45 also sends signals to the beeper device 25 over the beeper connectors 27 so that a beeping noise is emitted into the passenger compartment over the beeper speaker 26. In the preferred embodiment, the beeping noise is emitted a relatively low volume to provide the smoking passenger with a warning that the governor 60 will soon be activated. In an alternate embodiment, the beeping noise is amplified and emitted at a very high and annoying volume.

The dashboard sign 35 is also activated while the smoke sensor 80 detects smoke. In the preferred embodiment, an oscilator circuit (not shown) located inside the control circuit 45 provides power pulses to the illumination element 37 so that the dashboard sign 35 flashes on and off. In the preferred embodiment, an example of an acceptable illumination element 37 is a common light bulb, and the dashboard sign 35 has translucent areas which transmit the light emitted from the illumination element 37. Other embodiments include light emitting diodes or flourescent bulbs. The sign message 36 of the preferred embodiment is "NO SMOKING". In alternate embodiments of the present invention, the sign message 36 is the familiar smoking cigarette inside a slashed circle. Other anti-smoking messages are also considered to be within the scope of the present invention.

The control circuit 45 also activates the governor 60 after smoke is detected. In the preferred embodiment, the control circuit 45 includes a delay mechanism which provides a delay of 30 seconds before the governor 60 is activated. After being activated, if the automobile is moving, the governor 60 begins gradually reducing the speed of the engine until a predetermined automobile velocity is attained. After the smoke is removed, complete control of the automobile is returned to the operator. In an alternate embodiment, the governor 60 reduces the speed of the engine until the car is brought to an idle. Governing technologies are considered well-known within the automotive industry.

The ignition controller 70 is also signalled by the control circuit 45 when smoke is detected. The ignition controller 70 ensures that the automobile will not be started until smoke has been removed from the passenger compartment.

In another embodiment of the present invention, the audio message playback device 16 is activated each time the car is started. In some of those embodiment, the message is similar to the message caused by the detection of smoke within the passenger environment. In others, the message is different from that caused by the detection of smoke.

Implementation of the present invention renders an automobile a so-called "Smokeless Automobile". In one embodiment of the present invention, a smokeless automobile includes the anti-smoking apparatus 10 of the present invention and does not include any ashtrays or cigarette lighters in the car, thus making it even more difficult for a passenger to smoke inside the passenger compartment of the smokeless automobile.

Other embodiments of the present invention employ only a subset of the methods employed in the preferred embodiment of the present invention. For example, one embodiment includes the smoke sensor 80 connected in series with the beeper device 25 and the governor 60. Other combinations will suggest themselves to those skilled in the art and are also considered to be within the scope of the invention.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that the relative dimensions and relationships shown on the drawings are given as the preferred relative dimensions and relationships, but the scope of the invention is not to be limited thereby.

We claim:

1. Anti-smoking apparatus for use in an automobile to deter passengers from smoking within a passenger compartment of the automobile, said anti-smoking apparatus comprising:
   at least one sensor means for detecting the presence of smoke within an automobile passenger compartment;
   an engine governor means for connection to an automobile engine for controlling the speed of the automobile; and
   a control means connected to said at least one sensor means and said engine governor means for activating said engine governor means in response to detection of smoke by said at least one sensor means.

2. Apparatus of claim 1, wherein said engine governor means includes, at least, a means for gradually reducing the speed of the automobile until a predetermined speed is reached.

3. Apparatus of claim 1, wherein said engine governor means includes, at least, a means for gradually reducing the speed of the automobile until the automobile comes to a complete stop.

4. Apparatus of claim 1, wherein said control means includes, at least, a delay means for delaying, for a predetermined amount of time after detection of smoke by said at least one sensor means, activation of said engine governor means.

5. Apparatus of claim 1, further comprising an anti-smoking dashboard sign connected to said control means, said sign including, at least, an illumination element, and wherein said control means includes, at least, means for, while smoke is detected by said at least one sensor means, repeatedly turning on and off said illuminating element of said anti-smoking dashboard sign.

6. Apparatus of claim 1, further comprising a beeping means connected to said control means for emitting an electronic beeping noise within the passenger compartment, and wherein said control means includes, at least, a means for, while smoke is being detected by said at least one sensor means, activating said beeping means.

7. Apparatus of claim 6, wherein said beeping means includes, at least, amplification means for emitting the beeping noise at an annoyingly high volume.

8. Apparatus of claim 1, further comprising an audio message playback means connected to said control means for broadcasting an anti-smoking audio message within the passenger compartment, and wherein said control means includes, at least, a means for, while smoke is being detected by said at least one sensor means, activating said audio message playback means.

9. Apparatus of claim 8, wherein said audio message playback means includes, at least, a digital storage means for storing an anti-smoking audio message.

10. Apparatus of claim 1, further comprising an ignition control means connected to said control means for preventing an operator from turning on the automobile, and wherein said control means includes, at least, a means for, while smoke is being detected by said at least one sensor means, activating said ignition control means.

11. Anti-smoking apparatus for use in an automobile to deter passengers from smoking within a passenger compartment of the automobile, said anti-smoking apparatus comprising:
    at least one sensor means for detecting the presence of smoke within an automobile passenger compartment;
    an engine governor means for connection to an automobile engine for controlling the speed of the automobile, said engine governor means including, at least, a means for gradually reducing the speed of the automobile until a predetermined speed is reached;
    an anti-smoking dashboard sign including, at least, an illumination element;
    a beeping means for emitting an electronic beeping noise within the passenger compartment;
    an audio message playback means for broadcasting an anti-smoking audio message within the passenger compartment;
    an ignition control means for preventing an operator from turning on the automobile; and
    a control means for, while smoke is being detected by said at least one sensor means, activating said engine governor means after a predetermined period of time, said anti-smoking dashboard sign, said beeping means, said audio message playback means, and said ignition control means.

12. Anti-smoking apparatus for use in an automobile to deter passengers from smoking within a passenger compartment of the automobile, said anti-smoking apparatus comprising:
    at least one sensor means for detecting the presence of smoke within an automobile passenger compartment and for emitting an electronic signal in response the detection;
    a beeper means connected to said at least one sensor means for emitting an audio beeping noise in response to receiving the electronic signal from said at least one sensor means; and
    an engine governor means connected to said at least one sensor means for controlling the speed of an automobile in response to receiving the electronic signal from said at least one sensor means.

13. Anti-smoking apparatus for use in an automobile to deter passengers from smoking within a passenger compartment of the automobile, said anti-smoking apparatus comprising:
    at least one sensor means for detecting the presence of smoke within an automobile passenger compartment; and
    a nuisance means connected to said at least one sensor means for, while smoke is detected within the automobile passenger compartment, producing an annoying situation and encouraging removal of smoke from the passenger compartment, wherein said nuisance means includes, at least, an engine governor means for controlling the speed of the automobile.

* * * * *